United States Patent [19]

Chang et al.

[11] Patent Number: 4,885,872
[45] Date of Patent: Dec. 12, 1989

[54] GARAGE DOOR OPERATOR WITH PLASTIC DRIVE BELT

[75] Inventors: James S. Chang, Arlington Heights; Scott M. Clark, Elk Grove Village, both of Ill.

[73] Assignee: The Chamberlain Group, Inc., Elmhurst, Ill.

[21] Appl. No.: 305,606

[22] Filed: Feb. 1, 1989

[51] Int. Cl.$^4$ ............................................. E05F 11/00
[52] U.S. Cl. ................................... 49/362; 24/265 R; 24/31 R; 49/200; 160/189; 474/144
[58] Field of Search ................... 49/362, 360, 199, 200; 160/189, 188, 201; 24/265 R, 31 R, 37; 474/144 X, 151, 210

[56] References Cited

U.S. PATENT DOCUMENTS

| | | | |
|---|---|---|---|
| 2,084,733 | 6/1937 | Kahliff | 49/199 X |
| 3,683,710 | 8/1972 | MacFarland | 49/360 X |
| 3,722,141 | 3/1973 | Miller | 49/360 X |
| 4,114,473 | 9/1978 | Pollak | 474/144 |
| 4,231,191 | 11/1980 | Ellmore | 49/199 X |
| 4,330,960 | 5/1982 | Hasemann et al. | 49/360 X |
| 4,422,396 | 12/1983 | Szostak | 474/144 X |

OTHER PUBLICATIONS

Genie Owner's Manual, Automatic Garage Door Opener Systems with Genie Track—Drive.
Bernal Catalog (in German), Montageanleitung Garagentorantriebe BA 1000 MP/BA 3000 MP.
The Sears Best/Craftsman Owners Manual Garage Door Opener, 1988.
The DISOGRIN Catalog.
The BERNAL Catalog.

*Primary Examiner*—Philip C. Kannan
*Attorney, Agent, or Firm*—Fitch, Even, Tabin & Flannery

[57] ABSTRACT

A garage door operator includes a head unit held by a supporting structure remote from the garage door. A rail has a first end held by a supporting structure adjacent the door and a second end fixed adjacent to and in alignment with a toothed drive wheel carried by the head unit. The garage door operator further includes an endless drive belt assembly trained about the drive wheel and a pulley held by the rail adjacent the garage door. The belt assembly includes a length of a plastic belt having teeth on one surface thereof matching the teeth on the drive wheel. The belt assembly further includes a trolley for connection to the garage door and a connector for joining one end of the plastic belt to one end of the trolley. The plastic belt has a lower surface to which the belt teeth extend, and the drive wheel has an upper surface to which the wheel teeth extend. Thus, the belt assembly can be installed by moving the plastic belt lower surface over the drive wheel upper surface until the respective sets of teeth are aligned, and moving the belt downwardly to train it about the drive wheel.

17 Claims, 4 Drawing Sheets

GARAGE DOOR OPERATOR WITH PLASTIC DRIVE BELT

This invention relates to operators for moving doors between open and closed positions and, more specifically, to such an operator having an endless drive belt assembly including a plastic drive belt.

BACKGROUND OF THE INVENTION

Garage door operators typically include an endless drive cable assembly trained over a pulley held adjacent the top of the garage door. The assembly often includes a metal chain held by a sprocket at the head unit which includes the motor. While the use of such a chain is generally satisfactory, it is somewhat noisy in operation and is relatively heavy. Furthermore, such a chain drive requires periodic lubrication for optimum performance.

During initial installation, care must be taken to keep the chain taut to avoid kinking. Additionally, because the sprocket teeth must enter the openings formed by the link of the chain, the chain cannot simply be aligned with the sprocket and moved downwardly because the teeth would interfere with the sides of the links. Instead the chain must be pulled past the sprocket teeth and, after alignment, then tightened to pull the chain back into engagement with the sprocket teeth. Simplified installation is always a major objective in a consumer product such as a garage door operator.

SUMMARY OF THE INVENTION

Among the several aspects and features of the subject invention may be noted the provision of an improved garage door operator. The operator includes a drive belt assembly including a plastic belt portion having teeth for engagement by a toothed drive wheel to provide relatively quiet operation. The belt assembly offers simplified installation as it can be directly moved onto the drive wheel because the wheel teeth do not extend through the plastic belt. Once installed, the belt is prevented from moving out of engagement with the drive wheel. Furthermore, the plastic belt portion is easily joined to other components of the belt assembly without piercing the plastic belt. The garage door operator of the present invention is reliable in use, has long service life, and is relatively easy and economical to manufacture. Other objects and features of the invention will be, in part, apparent and, in part, pointed out specifically in the following specification and accompanying drawings.

Briefly, a garage door operator embodying various aspects of the present invention includes a head unit which is fixed to the ceiling of the garage remote from the garage door. The head unit includes a motor and a drive wheel having spaced teeth on its periphery for being driven by the motor. The operator also includes a rail assembly having a first end held by a supporting structure adjacent and above the garage door with a pulley located adjacent the first end of the rail assembly. The rail assembly also includes a second end which is held adjacent to and in alignment with the drive wheel. The operator also comprises an endless drive belt assembly for training about the drive wheel and the pulley in two runs and for being supported by the rail assembly. The belt assembly includes a length of a plastic belt with teeth on one surface thereof matching the teeth on the drive wheel. The belt assembly also includes a trolley for connection to the garage door, and a first connector joining one end of the plastic belt to one end of the trolley. This plastic belt has a lower surface to which the belt teeth extend and the drive wheel has an upper surface to which the wheel teeth extend. The drive wheel is adapted to engage only the plastic belt component of the belt assembly.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
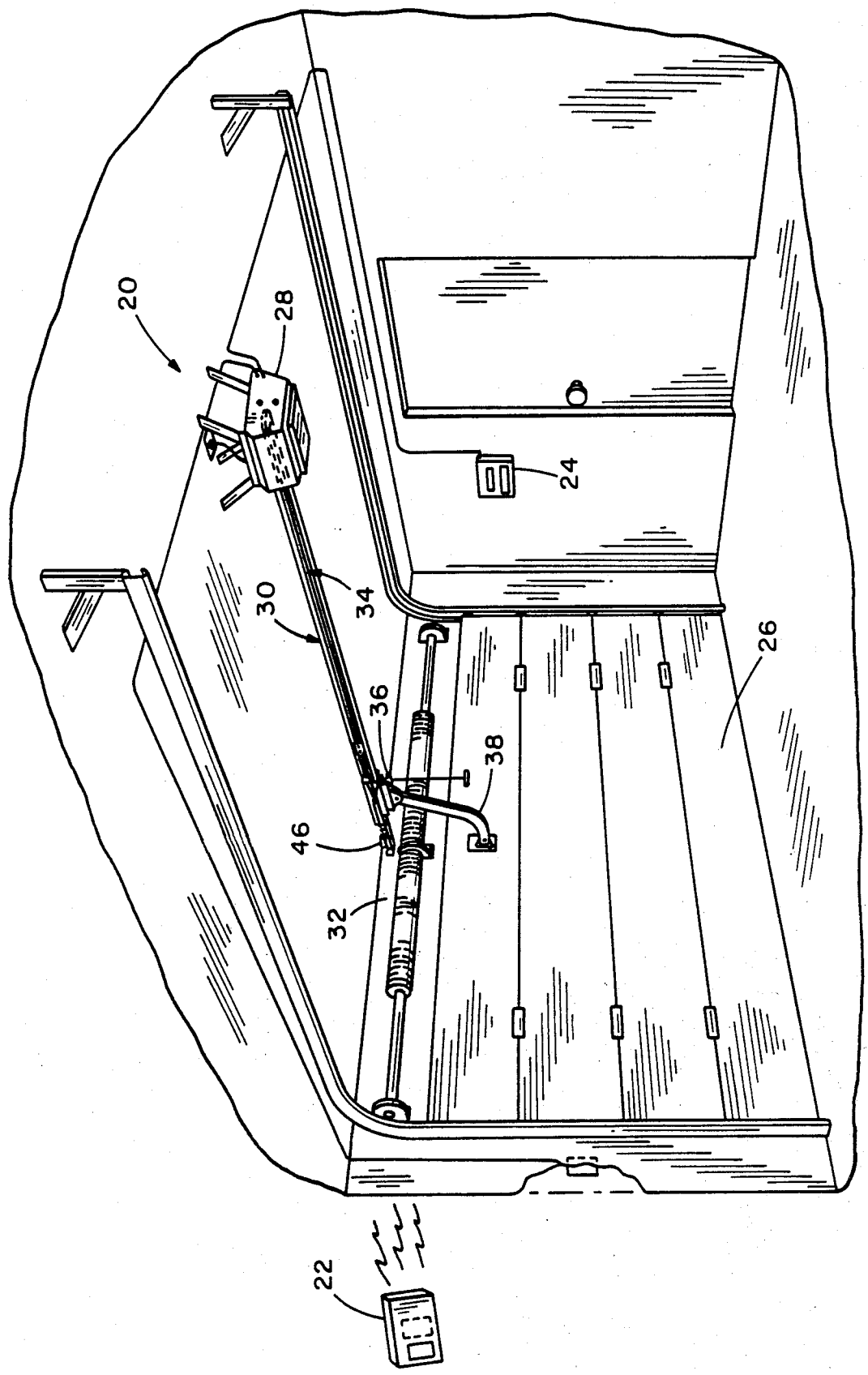
FIG. 1 is a perspective view of a garage door operator embodying various aspects of the present invention.
Figure 2:
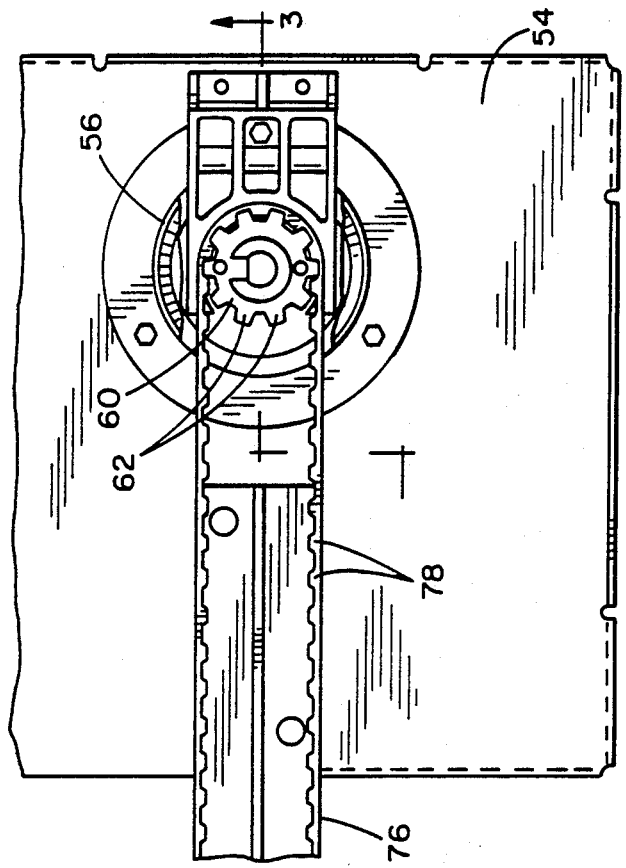
FIG. 2 is a plan view showing components of the operator including a plastic belt, driven by a drive wheel, with one belt end joined to a trolley by means of a connector.

Referring now to the drawings, a garage door operator embodying various aspects of the present invention is indicated generally in FIG. 1 by reference numeral 20. The operator, the operation of which is controlled by a radio frequency transmitter 2 and/or a wall control 24, functions to move a garage door 26 between open and closed positions. Included in the operator are a head unit 28 for positioning remote from the door 26 on supporting structure such as ceiling joists, an elongate rail assembly 30 extending between the door header 32 and the head unit 28, and an endless drive belt assembly 34 supported by the rail assembly and driven by the header unit. The belt assembly 34 includes a trolley 36 which is connected to the door 26 by a curved arm 38.

Figure 3:
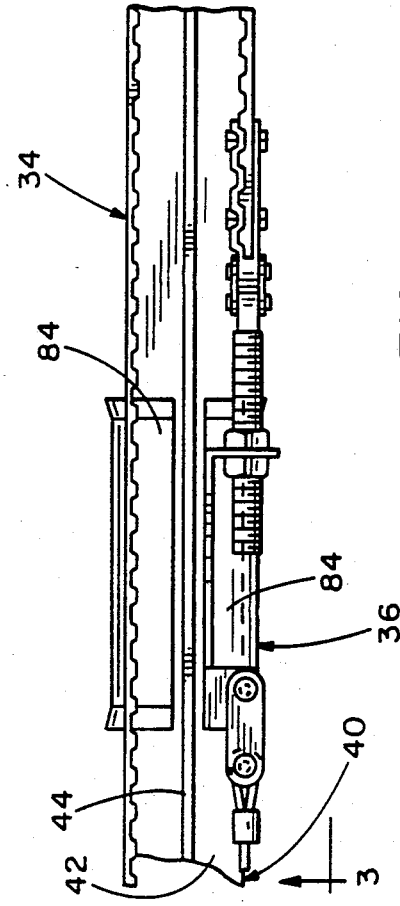
FIG. 3 is a side elevational view of the assembled components shown in FIG. 2, with certain components shown in section.
Figure 3:
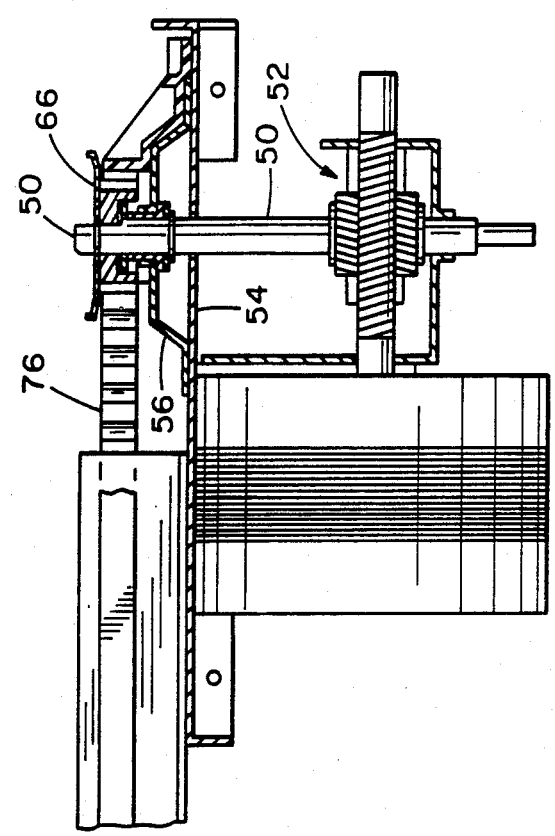
Figure 4:
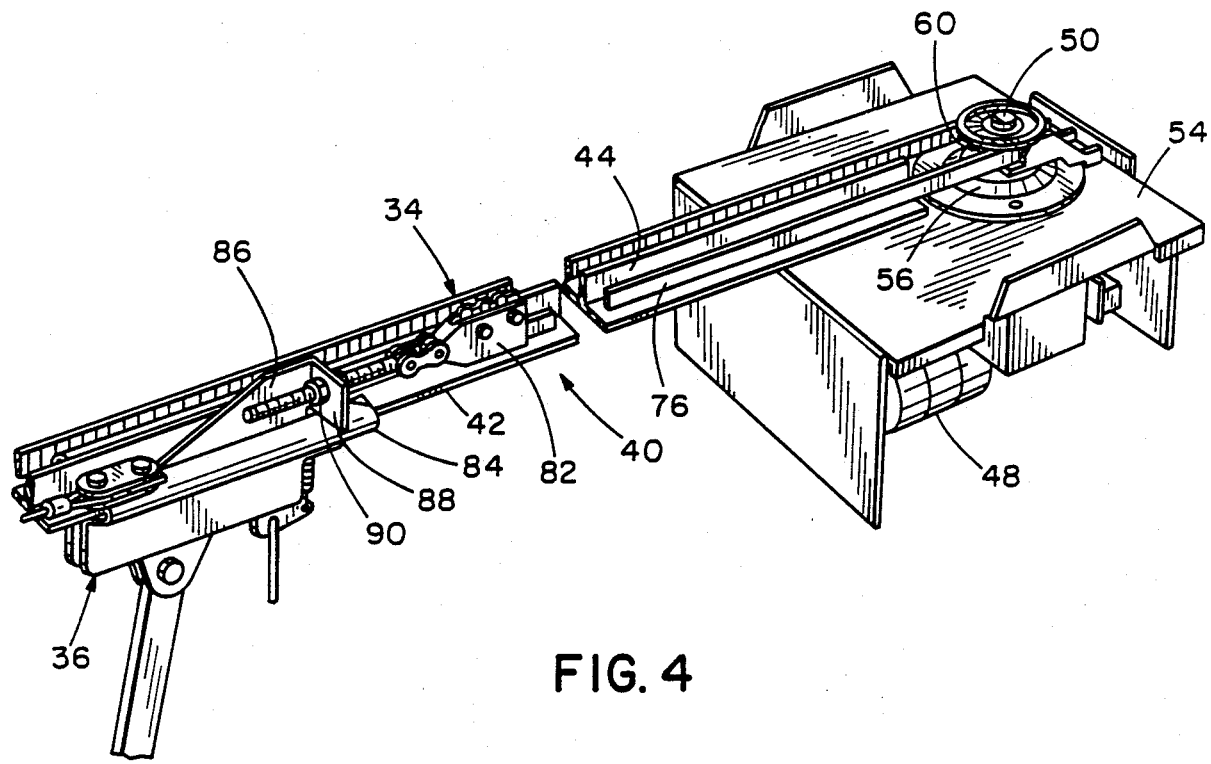
FIG. 4 is a perspective view of the assembled components of FIG. 2, with certain components removed to expose other components.

More specifically, the rail assembly 30 includes a rail 40 in the general shape of an inverted "T" having a horizontal flange 42 and a vertical stiffening wall 44, as best shown in FIG. 4. Referring to FIG. 1, there is a cable pulley 46 positioned at a first end of the rail assembly, while the second end of the rail assembly is held by the head unit 28. The head unit includes a chassis housing a motor 48 which drives an output shaft 50 through a right angle gear arrangement 52, as best shown in FIGS. 3 and 4, along with a radio frequency receiver and associated electronic components for controlling operation of the motor. The chassis has a top wall 54 on which is mounted a generally frustoconical collar support 56 holding a collar 58.

Figure 5:
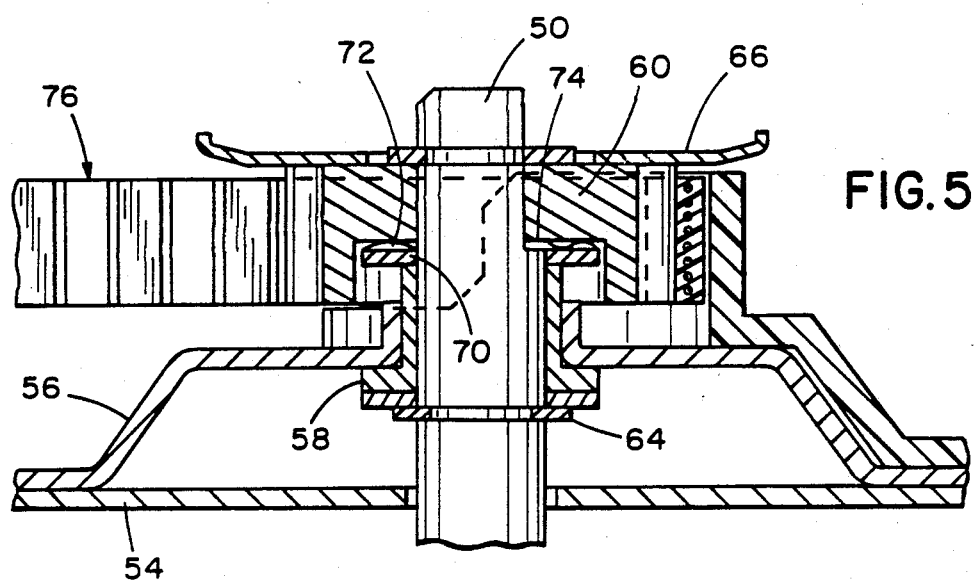
FIG. 5 is an enlarged side elevational view, with certain components in section, illustrating a guide shield for the drive belt, and a flange overlying the belt to maintain it in engagement with the drive wheel.
Figure 12:
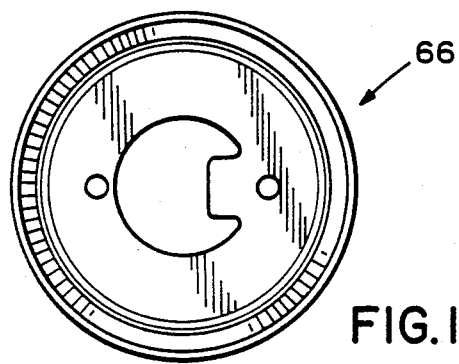
FIG. 12 is a plan view of the flange of FIG. 5.

Mounted on the output shaft 50, which extends through the top wall and the collar, is a drive wheel 60 having regularly spaced teeth 62 on its periphery. Downward movement of the collar 58 on the shaft 50 is restrained by a lower split ring 64 received in a lower peripheral groove in the output shaft, as shown in FIG. 5. A flange 66, best shown in FIG. 12, overlies the wheel 60 and is held against upward movement by an upper split ring 68 received in an upper peripheral groove in the output shaft. A washer 70 and a wave spring washer 72 are positioned between the collar and a recessed surface 74 in the wheel 60 to permit limited, restrained movement of the wheel in the axial direction of the output shaft.

Referring to FIG. 4, the endless drive belt assembly 34 is trained about the drive wheel 60 and the cable pulley 46 in two runs with the stiffening wall 44 of the rail 40 spacing the runs. The belt assembly 34 includes a length of a plastic belt 76 with a plurality of regular spaced teeth 78 on one surface thereof matching the teeth on said drive wheel. The assembly 34 also includes the trolley 36, a length of steel cable 80, a first connector 82 joining one end of the plastic belt 76 to one end of the trolley, and a second connector (not shown), which may be identical to the first connector, connecting the second end of the plastic belt to the cable. Of course, the remaining end of the cable is held by the other end of the trolley to complete the belt assembly.

The trolley 36 may be of conventional design and include a pair of arms 84 which are inwardly directed and ride on the upper surface of the rail flange 42. One arm 84 has an upstanding wall 86 with a transverse mounting tang 88, bent from the plane of the wall 86, having an aperture receiving a tightening bolt assembly 90.

Figure 13:
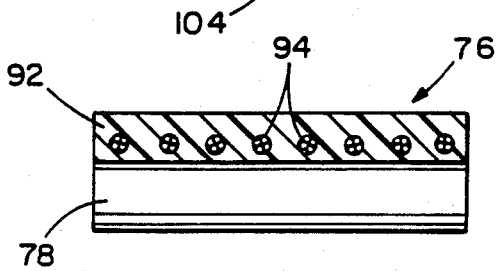
FIG. 13 is a transverse cross-sectional view of the plastic drive belt.

The plastic belt 76, as best shown in FIG. 13, includes a web 92 in which a series of transversely spaced, longitudinal extending tension members 94 are embedded. The belt is preferably formed of urethane with high strength steel tension members. Such a plastic belt is available from Disogrin Industries of Manchester, New Hampshire. The teeth 78 extend the entire width of the belt. Similarly, the teeth 62 of the drive wheel extend the width of the wheel. The head unit operates the drive belt assembly so that the wheel is only contacted by the plastic belt portion 76.

Referring to FIGS. 8-11, the first connector 82 is of one-piece construction and includes a pair of spaced side walls 96 and 98, each having first and second lateral edges, and first and second ends. The walls are spaced apart a distance at least substantially equal to the thickness of the belt 76. The side wall 98 has a surface facing the other side wall and has undulations, including crests 100 corresponding to web portions of plastic belt 76 between teeth 78, and valleys 102 corresponding to the toothed surface of the plastic belt. The connector also includes a floor 104 joining the side walls adjacent their first lateral edges to limit the extent of insertion of the plastic belt into the connector. The connector also comprises means for joining the connector to another component of the drive belt assembly 34, preferably in the form of an end wall 106 joining the side walls 96 and 98 at their first ends. A tongue 108 extends from the end wall 106 away from the side walls 96, 98 and includes an opening 110 for receiving a fastener such as a rivet or a screw.

The side walls 96, 98 also have aligned pairs of apertures 112 adjacent the second or open lateral edges of the side walls. The floor 104 and apertures 112 are spaced by at least substantially the width of the plastic belt 76. After the belt is positioned between the side walls adjacent the floor, fasteners can be installed through the aperture pairs to trap the belt in the connector and to compress the belt between the sidewalls. It will be appreciated that installation of the belt 76 in the connector 82 does not require that the belt be pierced by a fastener or in any way damaged, which could reduce belt strength.

Figure 6:
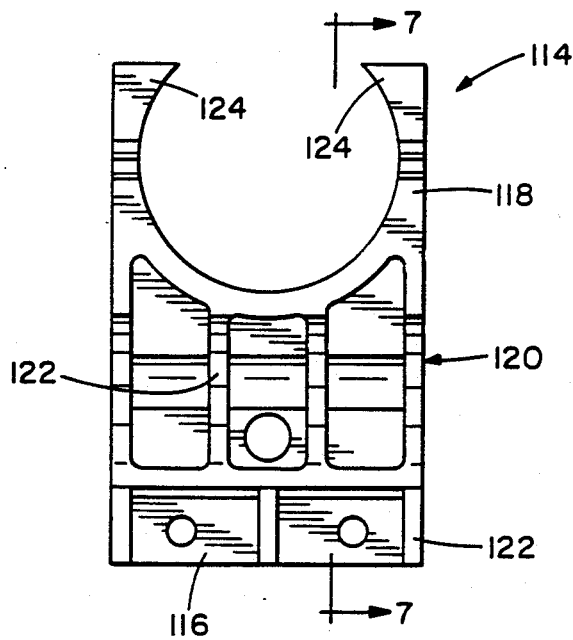
FIG. 6 a plan view of the guide shield.
Figure 7:
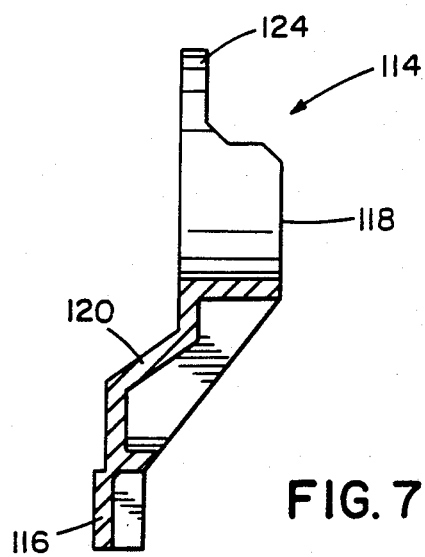
FIG. 7 is a sectional view taken generally along line 7—7 of FIG. 6.
Figure 8:
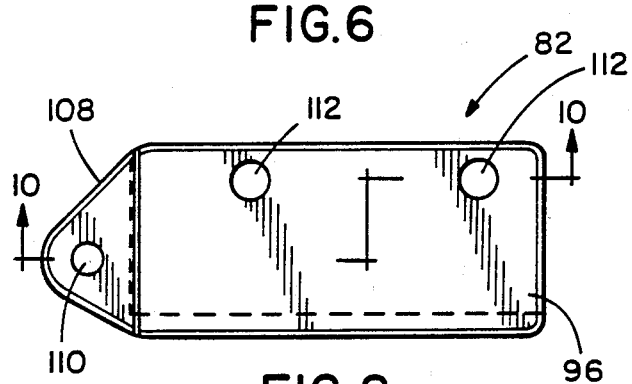
FIG. 8 is a front elevational view of the belt end connector of FIG. 2.
Figure 9:
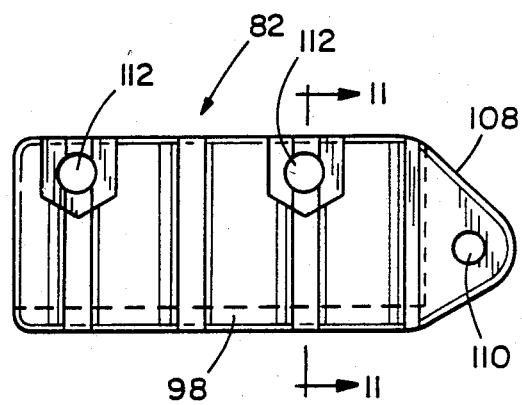
FIG. 9 is a rear elevational view of the connector.
Figure 10:
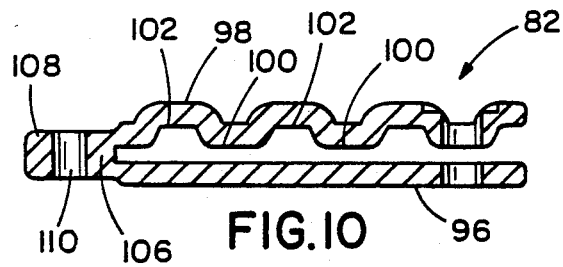
FIG. 10 is a sectional view taken generally along line 10—10 of FIG. 8.
Figure 11:
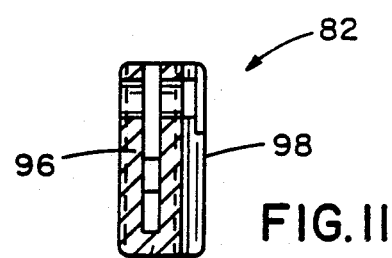
FIG. 11 is a sectional view taken generally along line 11—11 of FIG. 8.

The garage door operator 20 also includes a shield 114, best shown in FIGS. 6 and 7, for the plastic belt 76. The shield 114 may be of one-piece thermoplastic molded construction, and may be fabricated of Delrin 100, a registered trademark of DuPont for polyacetal resin. Shield 114 comprises a base 116 for mounting on the chassis top wall 54 adjacent the drive wheel 60. An arcuate wall 118 is connected to the base 116 by a step-shaped support 120 having a bottom surface conforming to the upper surface of the collar support 56, as best shown in FIGS. 3 and 5. Spaced strengthening ribs 122 can be provided on the base and support, respectively. The arcuate wall 118 is positioned closely adjacent the drive wheel 60 opposite the second end of the rail 40 and coplanar with the belt to preclude the belt from moving outwardly away from the drive wheel 60. The spacing between the wheel and arcuate wall is slightly greater than the web thickness of the plastic belt, and the bight of the tensioned belt about the wheel and the inside surface of wall 118 have substantially the same curvature.

The shield 114 further includes a guide arm 124 extending from each end of the arcuate wall 118. The guide arms are disposed beneath the level of the plastic belt 76 and converge so that their spacing is less than the distance between the two runs of the belt assembly so that said guide arms prevent the plastic belt from moving below the drive wheel. Accordingly, the arcuate wall 118 constitutes means for blocking the plastic belt from moving in the plane of the belt away from the drive wheel, the guide arms 124 constitute means for preventing the belt from moving downwardly with respect to said wheel, and the flange 66 (which has a diameter greater than the bight of the plastic belt) constitutes means for restraining upward movement of the belt relative to the wheel.

Installation of the belt assembly 34 on the drive wheel 60, prior to attachment of the flange 66 to the top of the drive wheel, is as follows: After the steel cable 80 has been trained around the cable pulley 46, and the bolt assembly 90 of the trolley 36 is adjusted to permit pulling of the plastic belt portion 76 over the top of the drive wheel until their respective sets of teeth are aligned, the plastic belt is merely moved downwardly. Thereafter, the flange 66 is installed, as by being fastened to the top of the drive wheel, to complete the captivity of the plastic belt on the drive wheel. Next, the bolt assembly 90 can be adjusted as needed to obtain the proper tension in the drive bet assembly.

It will thus be appreciated that the installation of the drive belt assembly 34, using the plastic belt portion 76, is greatly simplified compared to a drive belt assembly including a metal chain. Also the installation of the ends of the belts in the connectors 82 is easy and fast. The end of the belt 76 is simply aligned with the undulations of the side wall 98 and the belt end is moved between the sidewalls until the pairs of apertures 112 are exposed. Thereafter, fasteners are positioned in the pairs of apertures to lock the end of the belt in place. It will be further appreciated that maintenance is reduce because the plastic belt requires little lubrication.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A garage door operator for moving a garage door between an open position and a closed position, said operator comprising:
    a head unit for being fixedly held by a supporting structure positioned remote from said door, said head unit including a motor and a drive wheel having spaced teeth on its periphery for being driven by said motor;
    elongate rail means having a first end for being fixedly held by a supporting structure disposed adjacent and above said door, said rail means including a pulley located adjacent said first end, said rail means further including a second end for being fixedly held adjacent to and in alignment with said drive wheel; and
    an endless drive belt assembly for training about said drive wheel and said pulley in two runs and for being supported by said rail means, said belt assembly including a length of a plastic belt with teeth on one surface thereof matching the teeth on said drive wheel, said belt assembly further including a trolley means for connection to said garage door and a first connector for joining one end of said plastic belt to one end of said trolley means, said plastic belt having a lower surface to which the belt teeth extend, said drive wheel having an upper surface to which the wheel teeth extend, said drive wheel being adapted to engage only said plastic belt component of said belt assembly whereby said belt assembly can be installed by training it around said pulley, moving the plastic belt lower surface over the drive wheel upper surface until their respective teeth are aligned and moving said belt downwardly to train it about said drive wheel.

2. A garage door operator as set forth in claim 1 wherein said belt assembly further includes a cable having one end for joining to the other end of said trolley means, and a second connector for joining the other ends of said plastic belt and said cable.

3. A garage door operator as set forth in claim 2 wherein said first and second connectors are identical.

4. A garage door operator as set forth in claim 1 wherein said first connector comprises a pair of walls having lateral edges and ends and spaced apart by at least substantially the thickness of said plastic belt, a floor extending between said side walls adjacent one of their lateral edges, one of said side walls having a facing surface with undulations corresponding to the teeth of said plastic belt, said side walls having at least one set of aligned apertures for receiving a fastener, said floor and apertures being spaced by at least substantially the width of said plastic belt whereby after the plastic belt is positioned with respect to the other lateral edges of said side walls with the belt teeth aligned with said undulations, said plastic belt can be moved between said side walls towards said floor until said apertures are cleared so that said fasteners can be installed to capture said belt.

5. A garage door operator as set forth in claim 4 wherein said first connector further includes an end wall joining said side walls adjacent their first ends.

6. A garage door operator as set forth in claim 5 further including a tongue extending from said end wall and away from said side walls, said tongue having an opening for receiving a fastener.

7. A garage door operator as set forth in claim 1 wherein said plastic belt includes spaced tension members embedded in the plastic material forming the belt.

8. A garage door operator as set forth in claim 8 wherein said tension members are formed of steel.

9. A garage door operator as set forth in claim 1 wherein said head unit includes a chassis upper wall, said drive wheel being disposed above the level of said upper wall, said rail means second end being adapted for mounting on said upper wall.

10. A garage door operator as set forth in claim 9 further comprising a flange overlying said drive wheel and of greater diameter than said drive wheel for preventing said plastic belt from moving upwardly with respect to said drive wheel.

11. A garage door operator as set forth in claim 9 further comprising means for blocking said plastic belt from moving in the plane of said belt away from said drive wheel, means for preventing said plastic belt from moving downwardly with respect to said wheel, and means for restraining movement of said belt upwardly with respect to said wheel.

12. A garage door operator as set forth in claim 9 further including a shield for said plastic belt, said shield comprising a base for mounting on said upper wall adjacent said drive wheel, an arcuate wall supported by said base for positioning closely adjacent said drive wheel opposite said rail means second end and coplanar with said plastic belt to preclude said belt from moving outwardly away from said drive wheel, and a guide arm extending from each end of said arcuate wall, the guide arms being disposed beneath the level of said plastic belt and converging so that their spacing is less than the spacing between the two runs of said belt assembly so that said guide arms prevent said plastic belt from moving below said drive wheel.

13. A garage door operator as set forth in claim 10 wherein the curvature of said arcuate wall corresponds to the curvature of said plastic belt and said drive wheel.

14. A garage door operator as set forth in claim 12 wherein said shield is of one-piece thermoplastic molded construction.

15. A connector for joining an end of a plastic belt having teeth on one surface thereof to another component of an endless drive belt assembly for use in a garage door operator, said connector comprising:
    a pair of spaced side walls, each wall having a first lateral edge, a second lateral edge, a first end, and a second end, said walls being spaced apart by at least substantially the thickness of said belt, one of said side walls having a surface facing the other of said side walls, said surface having undulations corresponding to the teeth of said plastic belt;

a floor joining said side walls adjacent the first lateral edges of said walls, said side walls having at least one set of aligned apertures for receiving a fastener, said floor and apertures being spaced by at least substantially the width of said plastic belt; and means for joining said connector to said another component and disposed adjacent the first ends of said side walls.

16. A connector as set forth in claim 15 wherein said means for joining includes an end wall joining said side walls, and a tongue extending from said end wall away from said side walls.

17. A shield for preventing a plastic belt, having spaced teeth on one side and which is trained about a toothed drive wheel in a garage door operator, from moving in the plane of the belt away from the drive wheel, and from dropping beneath said drive wheel, said shield being of integral thermoplastic construction and comprising:

a supporting base;

an arcuate wall held by said base for positioning closely adjacent said drive wheel at the bight of said belt and coplanar with said plastic belt, said arcuate wall having a curvature corresponding to the curvature of said belt; and a guide arm extending from each end of said arcuate wall, the guide arms being disposed beneath the level of said belt and converging so that they extend beneath said belt.

* * * * *

UNITED STATES PATENT AND TRADEMARK OFFICE
CERTIFICATE OF CORRECTION

PATENT NO. : 4,885,872

DATED : December 12, 1989

INVENTOR(S) : James S. Chang et al.

It is certified that error appears in the above-identified patent and that said Letters Patent is hereby corrected as shown below:

Column 2, line 25, after "FIG. 6" insert --is--.

Column 4, line 19, "100" should not be in boldface.

Column 4, line 63, change "bet" to --belt--.

Column 5, line 6, change "reduce" to --reduced--.

Signed and Sealed this

First Day of January, 1991

Attest:

HARRY F. MANBECK, JR.

*Attesting Officer*  *Commissioner of Patents and Trademarks*